Patented May 20, 1941

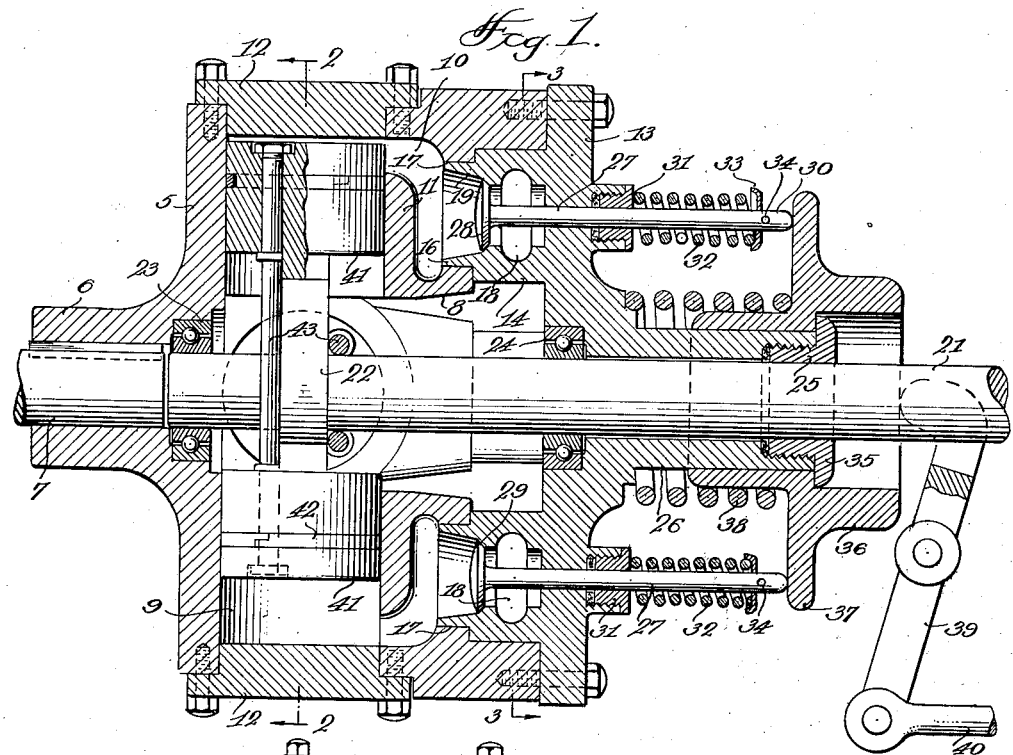
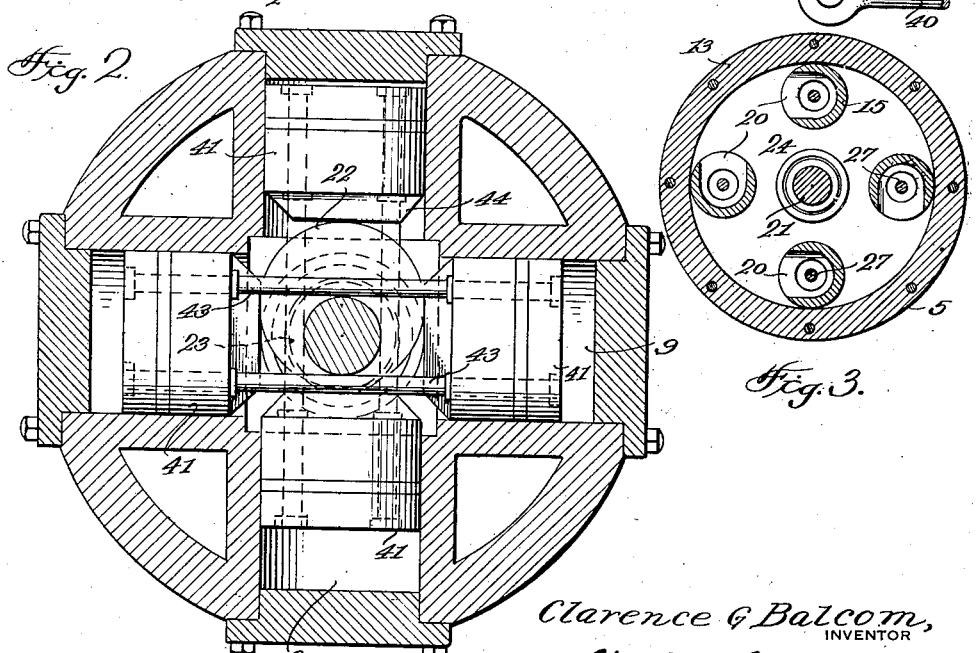

2,242,997

UNITED STATES PATENT OFFICE 2,242,997

HYDRAULIC TRANSMISSION CLUTCH

Clarence G. Balcom, Springdale, Conn.

Application January 9, 1939, Serial No. 250,042

1 Claim. (Cl. 192—60)

My invention relates to hydraulic clutches.

An important object of my invention is to provide a clutch that will make the coaction between the drive and driven shafts more efficient.

Another object of my invention is to provide a hydraulic clutch whereby the relation between the drive and driven shaft may be progressively changed from a free to a locked engagement.

Yet another object of my invention is to provide a hydraulic clutch whereby the relation between the drive and driven shafts may be progressively changed from a locked to a free engagement.

Still another object of my invention is to provide a hydraulic clutch that is simple in construction, efficient in operation and inexpensive to manufacture.

Other objects and advantages of my invention will be apparent during the course of the following description.

In the accompanying drawing, forming a part of this specification, and in which like numerals are employed to designate like parts throughout the same, Figure 1 is a longitudinal sectional view, showing parts in elevation, of a device embodying my invention, Figure 2 is a vertical sectional view, showing parts in elevation, taken on the line 2—2 of Figure 1, and Figure 3 is a vertical sectional view, taken on the line 3—3 of Figure 1.

In the drawing, wherein for the purpose of illustration, is shown a preferred embodiment of my invention, the numeral 5 designates a housing having a hub 6 formed at one end thereof in which is keyed for rotation therewith a driven shaft 7. The housing is provided with a central longitudinally extending chamber 8 having radially disposed cylinders 9 extending therefrom and communicating therewith. Communicating with the outer ends of the cylinders 9 is an annular passage 10 which is separated from the cylinders proper by a partition 11 which functions as a part of the cylinder walls. Cylinder heads 12 are bolted, or otherwise secured, to the housing, and effectively seal the outer end of the cylinders.

The head 13 is fitted into the housing 5 and formed therein is an annular recess 14 of substantially the same diameter as the central chamber 8 in the housing 5, with which it is directly communicative. Concentrically arranged about the recess 14 are bosses 15 which are formed with a reduced outer portion 16 which fit into openings 17 provided in the housing. The bosses 15 are provided with liquid receiving chambers 18 which are formed with a flared lateral-passage 19 in communication with the annular recess 10 of the housing 5. The liquid receiving chambers 18 communicate with the annular recess 14 through lateral ports 20.

Extending through the head 13 and terminating in abutting relation with the driven shaft 7 and in longitudinal alignment therewith is a drive shaft 21, having an eccentric 22 formed thereon centrally of the radially disposed cylinders 9. The drive shaft 21 is provided with ball bearings 23 and 24 to permit the free rotation thereof independently of the housing 5 and head 13. A packing nut 25 is carried by the drive shaft, and is threaded into the outwardly extending shank 26 of the head 13.

Valves 27 are positioned concentrically about the drive shaft and with the heads 28 thereof seated in the inner end 29 of the flared passages 19. The valve stems 30 extend outwardly through the head 13 and are provided with packing nuts 31 at their point of contact therewith. Springs 32 are interposed between the packing nuts 31 and the retainers 33 which are positioned adjacent the outer end of the stem and held against longitudinal displacement by the transversely extending pin 34. The packing nut 25 is formed with an annular projecting head 35 which is of greater diameter than the shank 26 of the head 13 and forms a seat for the adjusting disk 36 which is slidably mounted on the shank 26 and held against outer longitudinal displacement by the head 35 of the packing nut 25. The adjusting disk 36 is formed with an annular flange 37, the inner face of which bears against the outer ends 30 of the valves 27, and a spring 38 is interposed between the inner face of the flange 37 and the outer face of the head 13 to maintain the adjusting disk engaged with the head of the nut 25 and touching but not actuating the valves 27. The clutch plate 36 is actuated longitudinally of the shank 26 by a clutch pedal (not shown) which is connected to the yoke lever 39 through the connecting rod 40.

Mounted to reciprocate within the radially disposed cylinders 9 are pistons 41, having conventional piston rings 42 to effectively seal the cylinder walls. The underside of the pistons 41 are formed with chamfered flanges 44 which bear against the eccentric 22, and diametrically opposed pairs of the piston 41 are rigidly connected together by pins 43 which straddle the driving shaft 21 on either side of the eccentric 22, as illustrated in Figure 1.

The operation of my device is as follows:

A liquid suitable for hydraulic purposes is provided within the central passage 8 and 14 of the housing 5 and head 13. It will be noted that due to the construction of the eccentric 22 one of the diametrically opposed pistons 41 will be at the outer end of the cylinder and the opposite piston thereof will be at the inner end of its respective cylinder, and that as the drive shaft is rotated the eccentric formed thereon will cause the pistons 41 to alternately reciprocate within the cylinders 9. As long as the hydraulic fluid is in the central passage 8, the drive shaft will be free to rotate independently of the housing on the bearings 23 and 24, and the pistons 41 will reciprocate freely within the respective cylinders 9. The oil will remain in the central passage as long as the clutch is depressed and holds the adjusting disk 36 in the inner position against the action of the spring 38 and with the inner face of the flange 37 bearing against the valve stems 30 sufficient to hold the valves 27 in fully open position. As soon as the clutch is released the adjusting disk 36 will return under the action of the spring 38 to a position against the head of the packing nut 35 permitting the valves 27 to close.

Inasmuch as the valves are in no way connected to the disk 36 they are free to operate independently of the same, and when the drive shaft 21 rotates, actuating pistons 41, a suction will be created in the outer end of the cylinders 9. As soon as this suction is formed the valves 27 will be unseated into the flared passages 19 at each suction stroke of the piston, and the hydraulic fluid in the central chamber 8 will flow into the annular passage 10 through the ports 20 of the bosses 15. The passage 10 communicates with the outer end of the cylinders, and when the piston is in the innermost position the oil will flow into the cylinder between the top of the piston and its respective head 12. When the piston returns on the upstroke it will be limited in the distance it can return due to the presence of the fluid between its top and piston head 12, and will therefore cause a binding action to be made between the chamfered flange 42 and the eccentric 22. As soon as this occurs, the housing 5 and head 13 will begin to revolve in accordance with the drive shaft 21, however, as long as the space between the pistons and cylinder heads 12 is not entirely filled there will be a certain amount of slippage between the housing and the drive shaft. Inasmuch as the driven shaft 7 is keyed to rotate with the housing, the rotation imparted to the housing will in turn be transmitted to the driven shaft 7.

As soon as the housing begins to rotate the fluid within the passage 8 will be thrown to the outside, and because of the lateral positioning of the ports 20, will enter within the chamber 18 of the bosses 15 and as the valves 27 are opened at each suction stroke of the piston 41, more of the fluid will be pulled into the annular passage 10, and consequently into the space between the piston and cylinder. As soon as this space is entirely filled the driven shaft 7 will rotate in one-to-one ratio with the drive shaft 21, and will continue to do so until the adjusting disk 36 is actuated by the clutch to open the valves 27 and the accelerator released. The drag of the rear wheels will be transmitted to the driven shaft 7 and exert a retarding force on the housing 5 which will consequently be transmitted from the pistons 41 to the drive shaft 21. The force exerted will cause the pistons 41 to reciprocate slightly within the cylinders 9. When the valves 27 are held open, a clear passage leads from the annular passage 10 to the inner chamber 8, and the reciprocation of the pistons 41 will force the fluid out of the space between the piston and cylinder head and into the said central chamber. This will take but a very short time after the valves 27 have been opened. As soon as the space between the piston and cylinder head has been cleared of the fluid, the piston will be free to reciprocate within the cylinders and no rotary motion will be transmitted to the housing or to the driven shaft 7.

It may be seen that by varying the amount of fluid between the piston and cylinder head progressively from a full to an empty condition, the ratio of the driven shaft 7 to the drive shaft 21 may be progressively altered. When the said space is empty there will be no motion transmitted to the housing 5 or the driven shaft 7, and as increasingly greater amounts of fluid are introduced into this space the slippage of the drive shaft with the housing will become increasingly less, and as soon as the fluid entirely fills the space no slippage at all will be evident between the drive shaft and the housing, and the ratio of the drive shaft to the driven shaft will be one-to-one.

It is to be understood that the form of my invention herewith shown and described is to be taken as a preferred example of the same, and that various changes in the size, shape and arrangement of parts may be resorted to without departing from the spirit of my invention, or the scope of the appended claim.

Having thus described my invention, I claim:

In a hydraulic clutch of the type including a casing having a fluid chamber and cylinders opening into the chamber, pistons operating within the cylinders and passages connecting the fluid chamber with the outer ends of the cylinders, the improvement comprising valves positioned within the passages and having valve stems extending exteriorly of the casing, said valves unseating in the direction of the pistons and controlling the flow of fluid through the passages, spring means urging the valves in a direction to close the passages, suction existent in the outer ends of the cylinders during the suction stroke of the pistons unseating the valves against the resilient action of the spring means and drawing fluid from the chamber into the outer ends of the cylinders, and a manually operated actuator plate movable into engagement with the valve stems to simultaneously unseat all of said valves and to hold the valves in the said unseated position, whereby operation of the pistons will discharge the fluid in the cylinders into the central chamber.

CLARENCE G. BALCOM.